US008099067B2

(12) United States Patent
Su

(10) Patent No.: US 8,099,067 B2

(45) Date of Patent: Jan. 17, 2012

(54) DATA SIGNAL SYSTEM

(75) Inventor: Jie Su, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 978 days.

(21) Appl. No.: 11/195,908

(22) Filed: Aug. 3, 2005

(65) Prior Publication Data

US 2007/0032217 A1 Feb. 8, 2007

(51) Int. Cl.
*H04B 1/18* (2006.01)
*H04B 7/00* (2006.01)

(52) U.S. Cl. .................. 455/161.1; 455/260; 455/186.1; 381/2; 375/346; 375/324; 375/267; 375/375

(58) Field of Classification Search ............... 455/161.1, 455/260, 186.1; 381/2; 375/346, 324, 267, 375/375
See application file for complete search history.

(56) References Cited

U.S. PATENT DOCUMENTS 4,849,750 A * 7/1989 Andros et al. ............... 340/7.25
5,220,682 A * 6/1993 Tomohiro .................. 455/161.2
5,303,399 A * 4/1994 Kobayashi .................. 340/7.55
5,457,423 A * 10/1995 Hegeler ........................ 329/304
5,726,992 A * 3/1998 Roither ......................... 714/704
5,745,845 A * 4/1998 Suenaga et al. ............ 455/194.1
6,018,648 A * 1/2000 Duckeck et al. ........... 455/154.2
6,038,434 A * 3/2000 Miyake ...................... 455/186.1
6,195,783 B1 * 2/2001 Nyenhuis et al. ............. 714/798
6,256,359 B1 * 7/2001 Masumoto et al. ........... 375/333
6,711,390 B1 * 3/2004 Moers ........................ 455/186.1
6,868,129 B2 * 3/2005 Li et al. .......................... 375/324
6,944,301 B1 * 9/2005 Nohrden et al. ................ 381/13
6,961,548 B2 * 11/2005 Groeger et al. ............ 455/161.1
7,526,254 B2 * 4/2009 Toporski ......................... 455/45
2002/0126771 A1 9/2002 Li et al.
2004/0132418 A1 * 7/2004 Wildhagen .................... 455/130
2005/0289589 A1 * 12/2005 Vermola ......................... 725/35

* cited by examiner

*Primary Examiner* — Wen Huang

(57) ABSTRACT

A demodulation system for Radio Data System (RDS) signals in a receiver includes a quadrature mixer (303) configured to convert a RDS signal at an input frequency directly to a base band RDS signal, a single filter (305) configured to filter the base band RDS signal to provide a RDS signal, and a signal level detector (311) configured to provide an indication of a level of the RDS signal (313), a demodulator (315) configured to demodulate the RDS signal and provide RDS data, the RDS data corresponding to information for user consumption, where the indication is used for selectively interrupting the user consumption when the level of the RDS signal is unsatisfactory. Other aspects of the RDS and corresponding methods include interference mitigation and include a blanker (323) configured to remove impulse noise from a RDS signal to provide the RDS signal without impulse noise and a demodulator (315) coupled to the blanker and configured to demodulate the RDS signal to provide data corresponding to information for user consumption.

19 Claims, 3 Drawing Sheets

DATA SIGNAL SYSTEM

FIELD OF THE INVENTION

This invention relates in general to receivers and more specifically to techniques and apparatus in receivers that are arranged and constructed for receiving radio data system signals.

BACKGROUND OF THE INVENTION

The Radio Data System (RDS) is used to broadcast information together with Frequency Modulated (FM) radio signals for automobile radios as well as home based FM receivers. The FM broadcast signal with the embedded RDS signal is known as a multiplex (MPX) signal. This signal includes information such as program identification including type of program (news, music, etc.), traffic information, title of a song, artist, and the like. In some automotive radios, the radio can switch to another station with the same programming when a given signal deteriorates. The RDS signal may also be accompanied by a Motorist Information System (referred to commonly as ARI) signal. Both the RDS and ARI signals are relatively narrowband signals spaced at 57 KHz (see FIG. 2).

Various problems (interference or anomalies) have been observed in radios using RDS. For example, when a signal rapidly deteriorates the user may be presented with low quality information due to the weak signal conditions. It is important that the RDS minimizes the occurrence of low quality information. In those instances when the FM signal combined with noise results in an amplitude modulated (AM) signal that exceeds 100% modulation, large impulse noise components may be introduced into the RDS signal after FM demodulation and thus interfere with proper demodulation of the RDS signal. Normally the RDS signal is a suppressed carrier signal, however some broadcasters do not observe this convention and broadcast an MPX signal with an unsuppressed subcarrier. This results in another form of interference in attempts to properly demodulate the RDS signal.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
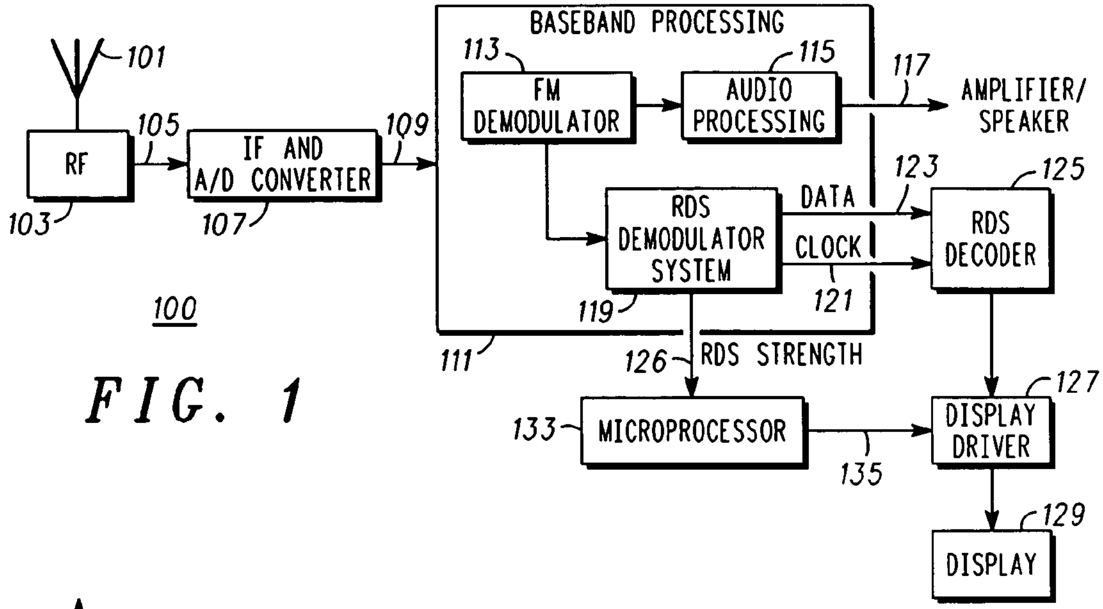
FIG. 1 depicts in a simplified and representative form, a high level block diagram of a receiver using a radio data system in accordance with one or more embodiments.

In overview, the present disclosure concerns receivers, and more specifically techniques and apparatus for use in a receiver arranged and configured to demodulate signals including embedded data signals, e.g. a radio data system (RDS) signal, in order to mitigate various forms of interference or other anomalies that may be associated with such signals and corresponding demodulation systems. More particularly various inventive concepts and principles embodied in methods and apparatus, e.g., receivers, radio data systems, demodulation systems, integrated circuits, and the like for receiving, demodulating, decoding, etc. data signals, such as RDS signals, while mitigating interference, will be discussed and disclosed.

The apparatus in various embodiments of particular interest may be or include receivers or the like for receiving and otherwise processing broadcast Frequency Modulated (FM) signals or similar signals that comprises the normal broadcast signal together with a data signal. These receivers may be employed in various transportation vehicles, such as automobiles, trucks, or similar vehicles as well as other forms of equipment such as construction or agricultural equipment and the like. These receivers may be found in various forms of entertainment equipment, including portable and home based receivers and the like. Such receivers or the data system portion thereof may be subject to loss of signal and various forms of interference or out of specification data signals. Systems, equipment and devices constructed and operating to receive multiplexed signals including decoding data signals, e.g., RDS signals, may advantageously utilize one or more of the methods and apparatus described below when practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level diagram of a receiver 100 suitable for using a radio data system (RDS) in accordance with one or more embodiments will be briefly discussed and described. In FIG. 1, an antenna 101 or the like is coupled to a radio frequency (RF) function 103. The RF function is known and operates to amplify, broadband filter, and, using a mixer and local oscillator (not shown), down convert RF signals available from the antenna, e.g. FM signals in a frequency band around 100 MHz in one or more embodiments, to an Intermediate Frequency (IF) signal at output 105. In various embodiments a desired signal corresponding to the channel the receiver is tuned to is centered at the IF frequency, e.g., 10.8 MHz.

The IF signal is coupled to an IF and analog to digital converter (A/D) function 107. The IF and A/D function are also known. The IF portion operates to attenuate all signals other than the desired signal centered at the IF frequency, e.g., 10.8 MHz, amplify the desired signal, and down convert the desired signal from the IF frequency to a base band (near zero) frequency. The A/D converts the base band signal from an analog format to a digital format and this digital signal is provided at the output 109 of the IF function. In various exemplary embodiments this digital signal may be a multiplexed signal (i.e., FM broadcast signal along with an RDS signal) and comprises 24 bit complex samples at a rate of 480 thousand samples per second (KS/s).

This digital signal at output 109 is coupled to a baseband processing unit 111. Much of all of the baseband processing unit can be implemented in an integrated circuit form comprising hardware or hardware together with some form of a known processor (digital signal processor, reduced instruction set processor, or the like) executing firmware and performing numerical processing on the samples of the signal at output 109. The base band processing unit 111 includes an FM demodulator 113 for demodulating the programming portion of the multiplex signal as well as an audio processing block 115 for various audio processing. The output signal(s) from the audio processing block 115 is passed at 117 to digital to analog converters, then to audio amplifiers and from there to speakers or the like (not specifically shown). The FM demodulator and audio processing are known functions that are not relevant to the present disclosure and thus will not be further discussed.

The base band processing unit 111 also includes a data demodulator, e.g., RDS demodulator or demodulation system 119. This system in one or more embodiments is coupled to the FM demodulator and receives a multiplex signal at 240 KS/s where the samples are 20 bits, demodulates this signal and provides a clock and a data signal, e.g., RDS signal data (outputs 121, 123 respectively) to a decoder 125. The RDS demodulation system also provides in one or more embodiments a signal strength indication, e.g., RDS signal strength, at output 126. A more detailed discussion of the demodulator or demodulation system 119 is provided below with reference to FIG. 3.

The decoder is configured to decode the RDS signal data in accordance with the appropriate radio data standard, e.g., known RDS standards, to provide decoded signals corresponding to information that was embedded in the RDS signal. The decoded signals or data is coupled to a display driver 127 and used to drive a display 129. Note that the decoded signals or data typically comprises information for user consumption, where this information may be displayed to a user or perhaps otherwise used to control some function of the receiver (for example, control channel scanning looking for a particular station name or for particular programming).

This RDS signal level indication is coupled to a controller 133 and used by the controller 133 to interrupt user consumption of information that may be decoded when the RDS signal level is not satisfactory, i.e., when the RDS signal level is low implying low quality or low confidence in the decoded data. For example, when the level is too low, the controller may operate via the path 135 to the display driver to either blank the display or alternative freeze the display. This avoids presenting the user with unreliable and likely erroneous data. The particular value for RDS signal level indication that is deemed appropriate may be experimentally determined and may vary depending on whether the level is used to control display updates or decide to switch to another station with the same programming.

Figure 2:
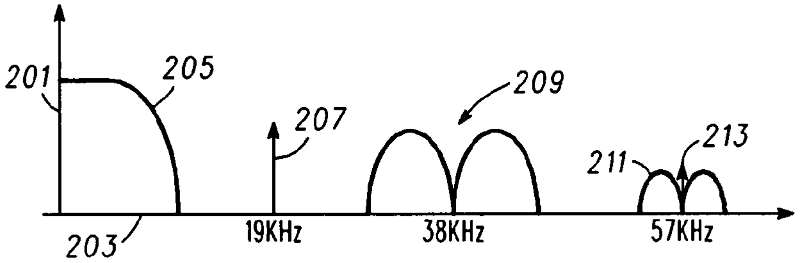
FIG. 2 shows a representative spectral diagram of a signal suitable for utilization of the receiver of FIG. 1 in accordance with one or more embodiments.

Referring to FIG. 2, a representative spectral diagram of a signal suitable for utilization of the receiver of FIG. 1 in accordance with one or more embodiments will be briefly discussed and described. FIG. 2 represents the spectral diagram of an FM multiplex signal such as may be used to modulate a carrier that is broadcast on a given channel from a given transmitter with power 201 shown on the vertical axis and frequency 203 shown on the horizontal axis. The representative spectra 205 is normally referred to as the mono or L+R spectra (left+right signal where left and right refer to the left and right channel in a stereo system). A pilot signal 207 is shown at 19 KHz and another representative spectra 209, normally referred to as the L−R spectra or signal is centered at 38 KHz.

A radio data system signal is represented by the spectra 211 with a suppressed subcarrier 213 located at 57 KHz. Note that the spectra 211 may contain an RDS as well as an ARI signal (Autofahrer-Rundfunk-Information-System referred to usually as a Motorist Information System in the United States). The ARI signal component when present is a narrowband amplitude modulated signal with a carrier frequency of 57 KHz while the RDS signal is a binary signal that consists of a continuous binary data stream with a bit rate of 1.1875 K bits/s and a bandwidth generally limited to +/−2.4 KHz of the 57 KHz carrier. The RDS signal is a suppressed carrier signal where the suppressed carrier is phase shifted by 90 degrees relative to the ARI carrier, thereby minimizing interference between the RDS and ARI components.

Note that the relative amplitudes and bandwidths shown in FIG. 2 are not necessarily to scale, e.g., the L−R spectra 209 generally extends form 23 KHz to 53 KHz. Generally this multiplex signal and the specifics are known with the details of the RDS signal specified in standards designated as Cenelec EN50067:1998. By recovering the present phase of the 19 KHz pilot signal the location in frequency and phase for the L−R and RDS signal are known with a similar level of accuracy.

Figure 3:
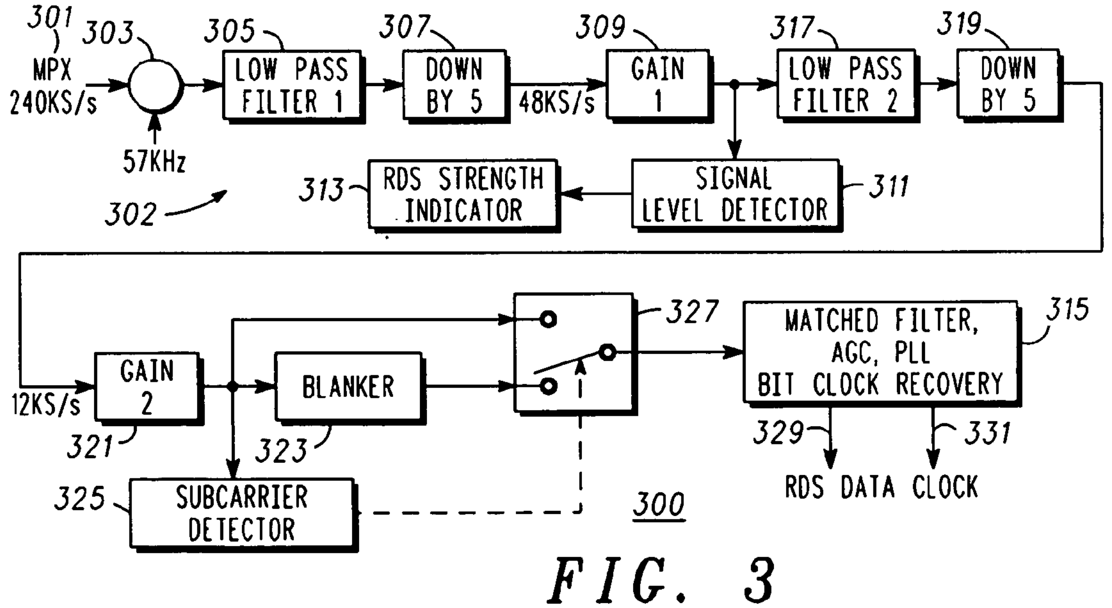
FIG. 3 depicts, a more detailed diagram of a demodulation system that may be utilized in the receiver of FIG. 1 in accordance with one or more embodiments.

Referring to FIG. 3, a more detailed diagram of a demodulation system that may be utilized in the receiver of FIG. 1 in accordance with one or more embodiments will be discussed and described. It will be appreciated that much of the functionality depicted in FIG. 3 can be implemented as firmware executed by a processor core, hardware, or a combination of each. FIG. 3 shows a more detailed functional/block diagram of a demodulation system 300 such as the RDS demodulator 119 of FIG. 1. The demodulation system 300 is a portion of receiver and is coupled to the multiplex signal 301 that in one or more embodiments is at a 240 KS/s rate. The multiplex signal is applied to a quadrature mixer 303 that is configured to convert (i.e., coupled to a 57 KHz local oscillator) the multiplexed signal that includes a radio data system (RDS) signal at an input frequency, e.g., 57 KHz, directly to a base band (zero or near zero frequency) RDS signal. Note that the base band RDS signal is a complex signal with real and quadrature (I and Q) components.

The outputs (I and Q) from the quadrature mixer 303 are coupled to a low pass filter 305 that in certain embodiments has a cutoff frequency around 24 KHz. It is noted that while FIG. 3 depicts and this discussion refers to filter, down sampler, etc. in the singular, since the signal is complex there is actually an I and a Q path throughout FIG. 3 unless otherwise noted explicitly or implicitly. The low pass filter 305 should be implemented as a Finite Impulse Response (FIR) filter or other filter that provides a linear phase transform. This single or sole filter is configured to filter the base band RDS signal to provide a RDS signal that is coupled to a down sampler 307. The down sampler reduces the sample rate by a factor of 5, i.e., discards 4 out of 5 samples, to provide an RDS signal at 48 KS/s. After applying an appropriate gain adjustment 309 the resultant RDS signal is coupled to a power or signal level detector 311. Thus in some embodiments, the quadrature mixer 303 is configured to convert a digital multiplexed signal at an input sample rate to a digital base band RDS signal and the single filter 305 is further coupled to a first down sampler 307 to provide the RDS signal at a first sample rate, e.g., 48 KS/s, and the RDS signal at the first sample rate is coupled to the signal level detector 311.

The signal level detector 311 is configured to provide an indication corresponding to a level of the RDS signal. The signal level detector essentially takes the average of the sum of the squares of the I and Q components of the RDS signal and provides an RDS strength indication 313 (corresponds to RDS strength 126 in FIG. 1). Note that both the I and Q path are coupled to the signal level detector. By using a signal direct conversion mixer 303 as discussed and a single filter 305 as well as keeping the sample rate as high as possible, e.g., 48 KS/s, any delay in determining the RDS level is minimized. Thus when the RDS quality is unsatisfactory (level is low) the indication will advantageously reflect that situation with minimal delay with this architecture.

Therefore as will be further discussed, when a demodulator 315 that is configured to demodulate the RDS signal and provide RDS data, where the RDS data corresponds to information for user consumption (see FIG. 1 125, 127, 129 and corresponding discussion), the indication of the level of the RDS signal will be suitable and timely and can be advantageously used for selectively interrupting the user consumption (e.g., freezing or blanking display) if the level of the RDS signal is unsatisfactory and thus the resultant data is unreliable. Advantageously, the user will not be observing nonsense in the display that results from an unreliable RDS signal.

The demodulation system 300 also in some embodiments includes a second filter 317 (FIR) that is coupled to the RDS signal at the first sample rate and in some embodiments has a cutoff frequency near or less than 6 KHz. The second filter is further series coupled to a second down sampler 319, e.g., that down samples by a factor of four (4), i.e., discards 3 of 4 samples of the RDS signal at the first sample rate. The down sampled 319 thus provides the RDS signal at a second sample rate, e.g., 12 KS/s, and the demodulator 315 is configured to demodulate the RDS signal at the second sample rate, e.g., in these embodiments 12 KS/s.

In some exemplary embodiments, the demodulation system 300 further comprises a gain stage 321 that adjusts the gain of the RDS signal, specifically the RDS signal at the second sample rate, and a blanker 323 that is coupled to the RDS signal (e.g., from the gain stage 321). The blanker 323 is configured and arranged to remove impulse noise from the RDS signal prior to the demodulator demodulating the RDS signal. Note that in those embodiments where the RDS signal is a digital signal, the blanker can operate to set a predetermined number of bits (e.g., 3 most significant bits) in each sample of the digital signal to a predetermined value (e.g., set to 0), thereby removing impulse noise from the RDS signal. Impulse noise may result from excess (100% or more) AM modulation of the FM envelope due, for example, to strong noise, and the resultant phase jump (180 degree phase shift) will produce large spikes in the RDS signal. By removing the most significant bits, the impulse noise can likewise be removed or reduced enough to avoid destroying or masking the RDS signal. As is further described below with reference to FIG. 5, the blanker can perform a plurality of shift operations on the samples corresponding to the RDS signal, thereby setting the predetermined number of bits to the predetermined value.

In one or more exemplary embodiments, the demodulation system 300 further comprises a subcarrier detector 325 and a switch 327. The subcarrier detector is coupled to the RDS signal, e.g., prior to or ahead of the blanker 323, and is configured to control the switch to alternatively couple the RDS signal (at or prior to input to blanker) and the RDS signal with the impulse noise removed (at or after output from blanker) to the demodulator 315. The subcarrier detector 325 in various embodiments detects an unsuppressed subcarrier, e.g. a carrier for the RDS signal that has not been suppressed. When the unsuppressed subcarrier is detected, the switch 327 is controlled, e.g., by the output from the detector 325, to couple the RDS signal to the demodulator and otherwise to couple the RDS signal with the impulse noise removed to the demodulator. Thus, in the presence of an unsuppressed RDS subcarrier, when the blanker might otherwise "blank" or eliminate the RDS signal, the blanker is effectively disabled, i.e., the blanker is bypassed thereby preserving the embedded or underlying RDS data.

The demodulator is generally known and includes a matched filter that is configured to essentially provide a complementary (mirror image) response to whatever response, vis-à-vis channel that the RDS signal was subjected to in transmission and receiving processes. After the matched filter the RDS signal is coupled to is an AGC system that compensates for or normalizes the RDS signal to a known level. The RDS signal is then coupled to a phase locked loop (PLL) demodulator that is used to detect frequency variations of the RDS signal (i.e., the data that was modulated onto the RDS Carrier). As is known the output of a loop filter portion of the PLL is a good indication of these frequency variations and thus RDS data. A known clock recovery scheme is then used to determine and recover bit or clock transitions. The RDS data and clock are provided at outputs 329, 331, respectively.

The demodulation system 300 in certain embodiments further comprises or may be viewed as further comprising a decoder (see FIG. 1 decoder 125) that is configured to decode the RDS data to provide decoded signals corresponding to the information for user consumption. The indication of signal level 313 can be used to interrupt a flow of the information to the user when the level of the RDS signal is unsatisfactory as earlier described.

It is noted that FIG. 3 also shows a Radio Data System (RDS) suitable for a Multiplexed signal receiver, where the RDS includes interference mitigation. The RDS comprises the blanker 323 coupled to and configured to remove impulse noise from an RDS signal as received to provide the RDS signal without impulse noise; and a demodulator 315 coupled to the blanker and configured to demodulate the RDS signal to provide data or RDS data corresponding to information for user consumption. In one or more embodiments where the RDS signal is a digital signal, the Radio Data System, specifically the blanker is further configured to set a predetermined number of bits in each sample of the digital signal to a predetermined value, e.g., 3 bits are set to 0 in each sample. In some embodiments as noted earlier, the blanker is configured to perform a plurality of shift operations on each sample (e.g., a left shift plus a right shift for each of the predetermined number of bits), thereby setting the predetermined number of bits to the predetermined value.

The Radio Data System can additionally comprise in one or more embodiments the subcarrier detector 325 coupled to the radio data signal and the switch 327 coupled to the RDS signal and the RDS signal without impulse noise. The subcarrier detector is configured to control the switch to alternatively couple the RDS signal and the RDS signal without impulse noise to the demodulator. As will be further discussed below with reference to FIG. 4, the subcarrier detector can comprise a low pass filter coupled to a comparator, wherein when an output of the low pass filter satisfies a threshold, the comparator provides a control signal suitable for controlling the switch so that the RDS signal rather than the RDS signal without impulse noise is coupled to the demodulator.

The Radio Data System often also comprises a decoder to decode the data from the demodulator 315 to provide RDS data or decoded data and a display driver coupled to the RDS data (see FIG. 1). As noted in the discussion referencing FIG. 1, the display driver is configured to present the information for user consumption on a display at least so long as the RDS data is reliable. Much of the balance of FIG. 3 can be viewed as an input portion 302 that is configured for receiving a digital multiplex signal at an input sample rate that includes the RDS signal at an input frequency. The input portion includes a complex mixer 303 that is configured to convert the RDS signal directly to a base band RDS signal, a first filter 305 and first down sampler 307 that are configured to filter the base band RDS signal and to provide the RDS signal at a first sampling rate, and a second filter 317 and second down sampler that are configured to filter the RDS signal at the first sample rate and to provide the RDS signal at a second sample rate. Note that the sample rates and filter corners can be set in various embodiments to the values noted in the earlier discussions.

Figure 4:
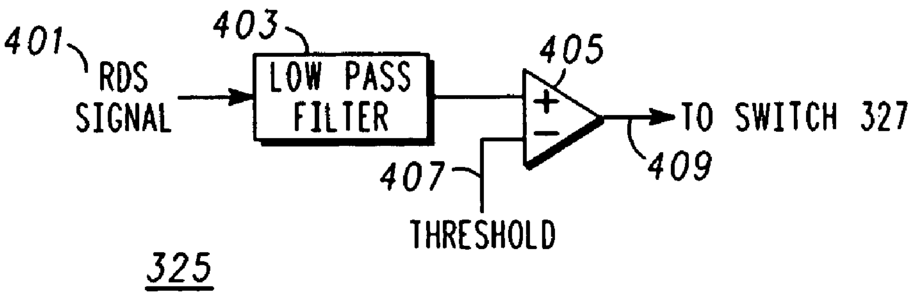
FIG. 4 depicts a representative block diagram of a subcarrier detector that may be utilized in the system of FIG. 3 according to one or more embodiments.

Referring to FIG. 4, a representative block diagram of a subcarrier detector that may be utilized in the system of FIG. 3 according to one or more embodiments will be discussed and described. FIG. 4 illustrates one embodiment of a subcarrier detector 325 wherein the RDS signal at input 401 is coupled to a low pass filter 403 (IIR or FIR). The low pass filter is essentially looking for the direct current (DC) level of the RDS signal given that the complex mixer is driven by a 57 KHz local oscillator and thus down converts the RDS carrier to DC (see FIG. 3 and FIG. 2) as will be appreciated by those of ordinary skill. The cutoff frequency of the low pass filter 403 is set for a frequency around 10 Hz. An output from the low pass filter is coupled to a comparator 405 where a threshold at comparator input 407 is compared to the threshold. When the output or output level from the low pass filter satisfies the threshold, the comparator provides a control signal at its output 409 that is suitable for or may be coupled to and used for controlling the switch 327, i.e., so that the RDS signal rather than the RDS signal without impulse noise is coupled to the demodulator. The threshold can be experimentally determined and will be tradeoff between false positives and false negatives and the implications of each.

Figure 5:
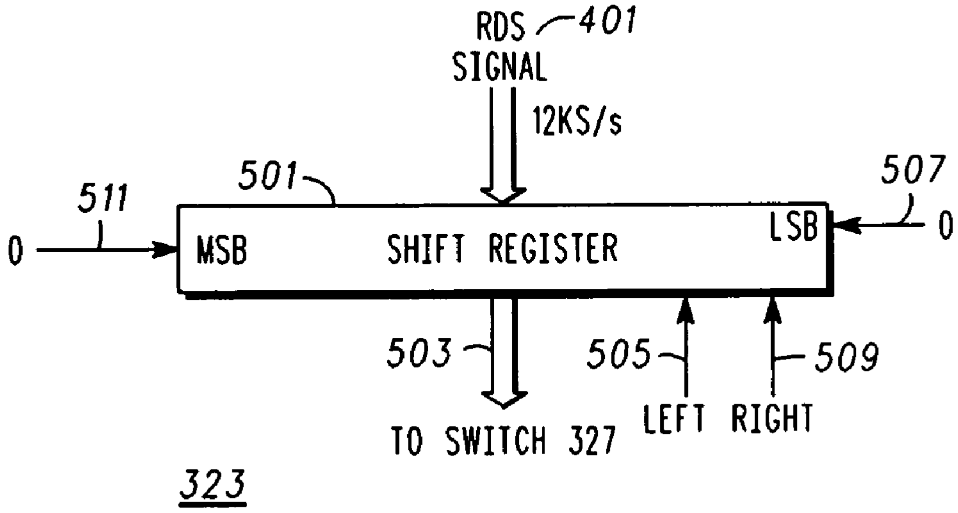
FIG. 5 depicts a representative block diagram of a blanker that may be utilized in the system of FIG. 3 according to one or more embodiments.

Referring to FIG. 5, a representative block diagram of a blanker 323 that may be utilized in the system of FIG. 3 according to one or more embodiments will be discussed and described. The blanker 323 in one or more embodiments is or may be viewed as a shift register 501 with the RDS signal 401 coupled as an input to the shift register and an output 503 that can be coupled to the switch 327. For each sample of the RDS signal that is input to the shift register the blanker can perform a plurality of shift operations and in this manner set a predetermined number of bits, such as 2 to 4 bits of the sample to a predetermined value, such as 0. The shift register is shown with the most significant bit (MSB) to the left and the least significant bit (LSB) to the right and further comprises a left shift control 505 with "0" coupled to the right register input 507 and right shift control 509 with "0" coupled to the left register input 511.

Thus when the blanker performs a left shift, i.e., exercises the left shift control etc., the contents of the shift register are shifted to the left, a zero is input at the right end or LSB position of the shift register, and the MSB is shifted out the left end of the register and thus discarded. If this left shift is followed by a right shift, i.e., the right shift control 509 is exercised, etc., the MSB will be loaded with a zero and the zero that was in the LSB position is shifted out and discarded. After the left shift followed by the right shift has occurred the contents of the shift register are the same as before the shifting operations, other than the MSB has been set to zero. It will be appreciated that two shifts to the left followed by two to the right would set the two MSB positions to zero. Alternative implementations of the blanker can include merely loading the least significant bits of the sample into a register, i.e., use a register that is smaller than the sample width and simply discard the predetermined number of bits that would otherwise be set to zero or the like.

Figure 6:
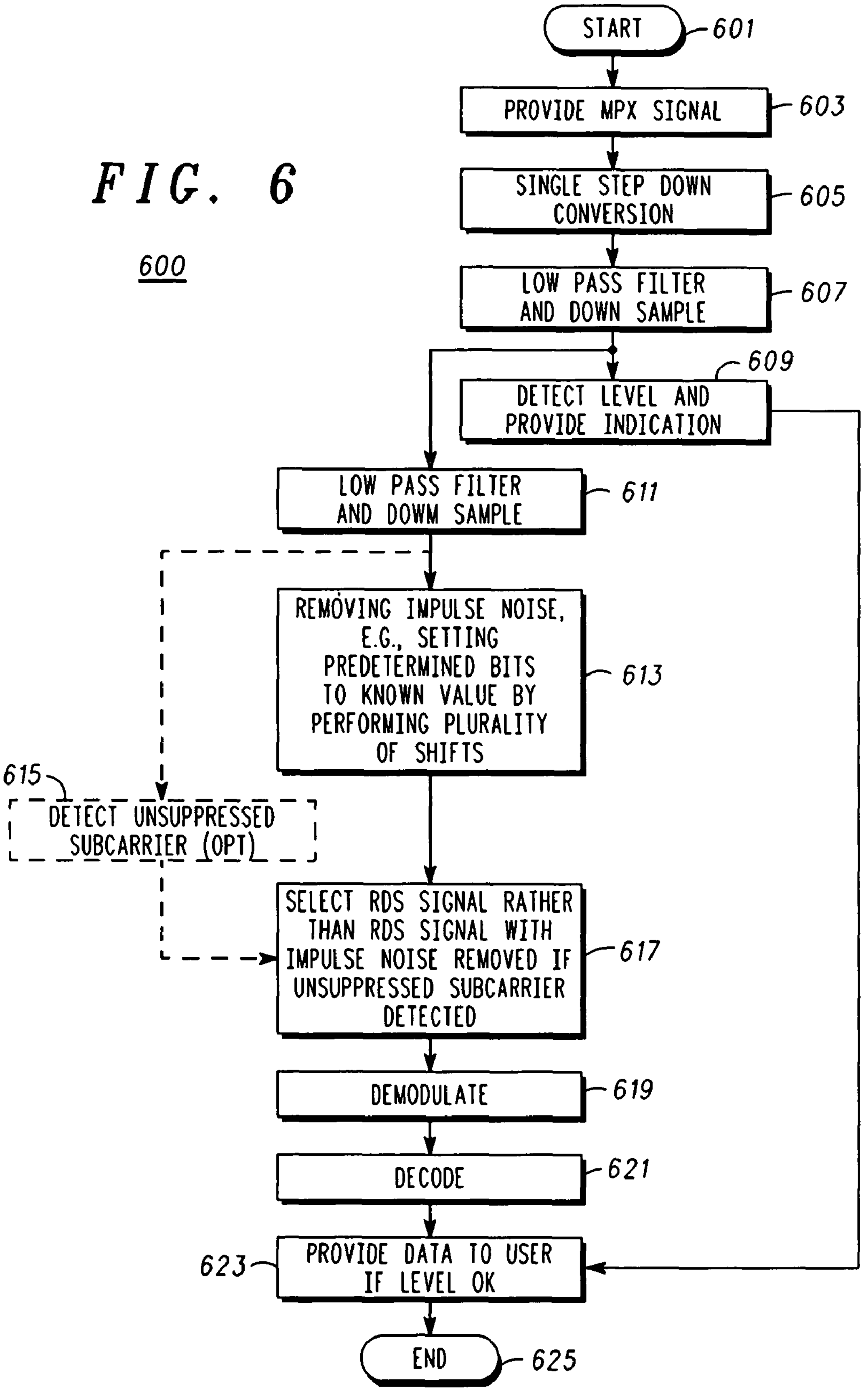
FIG. 6 shows a flow chart illustrating representative embodiments of methods of mitigating interference in an RDS in accordance with one or more embodiments.

Referring to FIG. 6, a flow chart illustrating representative embodiments of methods of mitigating interference in an RDS in accordance with one or more embodiments will be discussed and described. It will be appreciated that the method(s) of FIG. 6 use many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. FIG. 6 shows an embodiment of a method 600 of mitigating interference in a Radio Data System (RDS) where the method as an overview includes removing impulse noise from samples of a RDS signal; demodulating and decoding the RDS signal with the impulse noise removed; and providing data corresponding to the RDS signal in a form suitable for user consumption (see 613-623).

In more detail, the method 600 starts at 601 followed by providing or receiving a multiplex signal 603. The multiplex signal is down converted 605 via a single step mixing process in one or more embodiments. The resultant down converted multiplex signal in various embodiments is a digital signal, which at 607 is low pass filtered and down sampled. The resultant RDS signal is applied to a detector where the signal level is detected and an indication thereof is provided 609. The RDS signal is further filtered and down sampled 611. Then 613 is a process for removing impulse noise from the RDS signal and in one or more embodiments this amounts to setting a predetermined number of the most significant bits of each sample of the RDS signal to some predetermined value, e.g., zero. This may be accomplished by performing a plurality of shifts on the sample, e.g., one left shift followed by a right shift for each of the predetermined number of most significant bits. For example to set 3 bits equal to zero can be accomplished by 3 left shifts followed by 3 right shifts. Note that shifts may be performed in the opposite direction, i.e., right shift followed by left shift, if the most significant bits are stored toward the right end of the shift register.

In some embodiments 615 is performed to detect any unsuppressed subcarrier and when an unsuppressed subcarrier is detected, selecting the RDS signal rather than the RDS signal with the impulse noise removed is performed 617. The RDS signal or RDS signal without impulse noise (depending on result at 617) is then demodulated 619 and decoded 621 to provide data corresponding to the RDS signal in a form (visual display) suitable for user consumption 623. Note that providing this data may be interrupted if the indication of the signal level from 609 is not satisfactory. The method 600 ends at 625 but is continuously repeated as needed.

The processes, apparatus, and systems, discussed above, and the inventive principles thereof are intended to and can alleviate various forms of interference and other anomalous issues in Radio Data Systems in, e.g., FM Broadcast systems for automotive or home entertainment systems. Using these principles of eliminating impulse noise when appropriate and rapidly determining signal level and conditioning availability of RDS data on quality of that data can quickly enhance user satisfaction with relatively minimal costs and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A demodulation system in a receiver comprising:

a quadrature mixer configured to convert a multiplexed signal that includes a radio data system (RDS) signal at an input frequency directly to a base band RDS signal;

a single filter configured to filter the base band RDS signal to provide a RDS signal;

a signal level detector configured to provide an indication based on a level of the RDS signal;

a demodulator configured to demodulate the RDS signal and provide RDS data, the RDS data corresponding to information for user consumption, wherein the indication is suitable for selectively interrupting the user consumption of the information provided by the RDS data when the level of the RDS signal is unsatisfactory.

2. The demodulation system of claim 1 wherein the quadrature mixer is further configured to convert a digital multiplexed signal at an input sample rate to a digital base band RDS signal and the single filter is further coupled to a first down sampler to provide the RDS signal at a first sample rate, the RDS signal at the first sample rate coupled to the signal level detector.

3. The demodulation system of claim 2 further comprising a second filter coupled to the RDS signal at the first sample rate and series coupled to a second down sampler to provide the RDS signal at a second sample rate, the demodulator further configured to demodulate the RDS signal at the second sample rate.

4. The demodulation system of claim 1 further comprising a blanker coupled to the RDS signal and arranged to remove impulse noise from the RDS signal prior to the demodulator demodulating the RDS signal.

5. The demodulation system of claim 4 wherein the RDS signal is a digital signal and the blanker operates to set a predetermined number of bits in each sample of the digital signal to a predetermined value, to remove impulse noise from the RDS signal.

6. The demodulation system of claim 5 wherein the blanker performs a plurality of shift operations on the samples corresponding to the RDS signal, thereby setting the predetermined number of bits to the predetermined value.

7. The demodulation system of claim 4 further comprising a subcarrier detector and a switch, the subcarrier detector coupled to the RDS signal and configured to control the switch to alternatively couple the RDS signal and the RDS signal with the impulse noise removed to the demodulator.

8. The demodulation system of claim 7, wherein, when the subcarrier detector detects an unsuppressed subcarrier, the switch is controlled to couple the RDS signal to the demodulator and otherwise to couple the RDS signal with the impulse noise removed to the demodulator.

9. The demodulation system of claim 1 further comprising a decoder configured to decode the RDS signal data to provide decoded signals corresponding to the information for user consumption, wherein the indication is used to interrupt a flow of the information to the user when the level of the RDS signal is unsatisfactory.

10. The demodulation system of claim 1 wherein the quadrature mixer is electrically connected to an FM (frequency modulated) demodulator that provides the multiplexed signal that includes the RDS signal at an input frequency of 57 KHz, the quadrature mixer coupled to and driven by a 57 KHz local oscillator.

11. A Radio Data System (RDS) for a Multiplexed signal receiver, the RDS including interference mitigation and comprising:

a blanker coupled to and configured to remove impulse noise from a RDS signal as received to provide the RDS signal without impulse noise; and a demodulator coupled to the blanker and configured to demodulate the RDS signal to provide data corresponding to information for user consumption, wherein the RDS signal is a digital signal and the blanker is further configured to set a predetermined number of bits in each sample of the digital signal to a predetermined value and thereby mitigate interference due to the impulse noise in the RDS signal.

12. The Radio Data System of claim 11 wherein the blanker is configured to perform a plurality of shift operations on each sample, to set the predetermined number of bits to the predetermined value.

13. The Radio Data System of claim 11 further comprising a subcarrier detector coupled to the RDS signal and a switch coupled to the RDS signal and the RDS signal without impulse noise, the subcarrier detector configured to control the switch to alternatively couple the RDS signal and the RDS signal without impulse noise to the demodulator.

14. The Radio Data System of claim 13 wherein the subcarrier detector further comprises a low pass filter coupled to a comparator, wherein when an output of the low pass filter satisfies a threshold, the comparator provides a control signal suitable for controlling the switch so that the RDS signal rather than the RDS signal without impulse noise is coupled to the demodulator.

15. The Radio Data System of claim 11 further comprising a decoder to decode the data to provide RDS data and a display driver coupled to the RDS data, the display driver configured to present the information for user consumption on a display.

16. The Radio Data System of claim 11 further comprising an input portion for receiving a digital multiplex signal at an input sample rate that includes the RDS signal at an input frequency, the input portion comprising:

a complex mixer configured to convert the digital multiplex signal that includes the RDS signal directly to a base band RDS signal;

a first alter and first down sampler configured to filter the base band RDS signal to provide the RDS signal at a first sample rate;

a second filter and second down sampler configured to filter the RDS signal at the first sample rate and provide the RDS signal at a second sample rate.

17. A method of mitigating interference in a Radio Data System (RDS), the method comprising:

removing impulse noise from samples of a RDS signal;

demodulating and decoding the RDS signal with the impulse noise removed; and providing data corresponding to the RDS signal in a form suitable for user consumption, wherein the removing impulse noise further comprises setting a predetermined number of bits of each of the samples to a predetermined value to thereby mitigate the interference in the RDS signal.

18. The method of claim 17 wherein the setting a predetermined number of bits of each of the samples to a predetermined value further comprises performing a plurality of shifts operations on each sample.

19. The method of claim 17 further comprising detecting an unsuppressed subcarrier and when an unsuppressed subcarrier is detected, demodulating and decoding the RDS signal rather than the RDS signal with the impulse noise removed.

* * * * *